3,780,037
PROCESS FOR PREPARING CEPHALOSPORIN COMPOUNDS
George G. Hazen, Westfield, N.J., assignor to Merck & Co., Inc., Rahway, N.J.
No Drawing. Filed Nov. 29, 1971, Ser. No. 203,055
Int. Cl. C07d 99/16, 99/24
U.S. Cl. 260—243 C
8 Claims

ABSTRACT OF THE DISCLOSURE

A process is provided for preparing 7-acylamino-7-methoxy cephalosporins, which comprises methylating a substituted 7[1 - loweralkoxyethylideneamino]-7-hydroxy cephalosporin, then hydrolyzing to remove the imino linkage. The final products have antibacterial activity.

This invention relates to a process for preparing a compound having the formula:

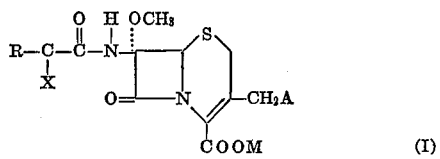

wherein X is hydrogen, amino, or carboxyl; R is phenyl or a 5-membered heterocyclic ring having 1–2 hetero atoms, the latter being either S, O, or N; A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkyl, thiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzolmethyl, or methoxy benzyl.

In summary, this invention provides two new routes for methylating a compound of the formula:

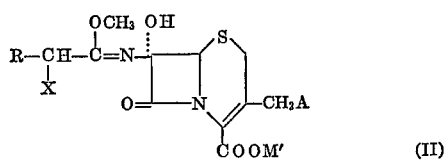

wherein R, X, and A are as defined above, and M' is an easily removed ester group such as benzyl, benzhydryl, trimethylsilyl, trichloroethyl, methoxymethyl, benzoylmethyl, or methoxybenzyl. Also operable as starting materials are compounds having a lower alkoxy group of from 2–4 carbon atoms, instead of the methoxy substituent on the ethylidene chain. Each route will be separately discussed below.

The first route utilizes a hyper-reactive methylating agent in reaction with Compound II. The term "hyper-reactive methylating agent" is employed to mean a methylating agent which is activated by the addition of a Lewis acid type catalyst. By the term "Lewis acid type catalyst" is meant a chemical compound which will accept an electron-pair and participate in the formation of a coordinate covalent bond. This definition is one widely accepted by those skilled in the art. Included within this definition, for instance, is boron trifluoride, boron trichloride, aluminum trichloride, tin (IV) chloride, titanium (IV) chloride, sulfur tetrafluoride, and other similar in character. Suitable Lewis acids for this invention include fluoroboric acid, boron trifluoride etherate, or aluminum chloride. Other Lewis acids will be known to those skilled in the art. They are prepared in inert solution prior to use and then added to the substrate at the time the methylating agent is added. One suitable methylating agent is diazomethane. The three components are mixed at temperatures ranging from −20° C. to ambient temperature, and preferably at about 0° C. Each of the three reactants (the starting material II, the Lewis acid, and the methylating agent) is employed in approximately equimolar amounts. After methylation is complete, in 1–5 hours, the reaction mixture is diluted by addition of aqueous acid, such as acetic or hydrochloric acids. The acid acts to hydrolyze the imino ether linkage to the desired amido side chain. The entire reaction proceeds spontaneously and is completed within 2–10 hours. The exact end point can be monitored using chromatographic techniques, and the duration of the reaction will obviously depend upon concentration and temperature.

The second route involves first, the treatment of the intermediate compound II with a strong base to prepare an activated hydroxy metal salt, followed by addition of a methylating agent. The strong base is preferably an inorganic base, such as sodium hydride, sodium hydroxide, potassium hydroxide, phenyl lithium, t-butyl lithium, or the like. Most preferably, phenyl lithium, t-butyl lithium, or sodium hydride is used, preparing, respectively, the lithium, or sodium salts. The activated salt intermediate is not isolated, but the methylating agent added directly to the reaction mixture. Suitable methylating agents include methyl sulfate, methyl halide, such as methyl iodide, methyl bromide, or methyl chloride, methyl trifluoromethyl sulfonate, trimethyl oxonium trinitrobenzene sulfonate, mesityl dimethoxy carbonium tetrafluoroborate, tetramethoxyphosphonium tetrafluoroborate, dimethyl iodonium hexafluoroantimonate, dimethyl chloronium hexafluoroantimonate, or dimethyl bromonium hexafluoroantimonate.

Each of the three reactants (the starting material II, the Lewis acid, and the methylating agent) is employed in approximately equimolar amounts. The reaction is conducted at low temperatures, preferably between −80° C. to 10° C., and most preferably at about −20° C. to 0° C. For safety, the reaction is conducted in an inert atmosphere, such as nitrogen gas.

After the methylation reaction is complete, in about 1–5 hours, the reaction mixture is acidified by addition of aqueous acid, such as acetic or hydrochloric acids. The acid acts to hydrolyze the imino ether linkage to the desired amido side chain.

The entire reaction is completed within 2–10 hours, and the exact end point is determined using chromatographic techniques.

The starting material, an ester of 7β-[1-lower-alkoxy-2-substituted ethylidene amino]-α-hydroxy-3-substituted methyl-decaphosporanic acid can be prepared using a number of methods; one suitable route starts from a 7-aminocephalosporin reaction with a suitable substituted acetyl halide formed by hydroxylation. The exact preparative route is given below in the specification.

The final products, the esters or preacid of 7β-substituted acetamido-7α-substituted methyldecephalosporanic acid, are useful as an antibacterial agent against both gram-positive and gram-negative bacteria. In addition, resistance to β-lactamases has been demonstrated. The activity spectrum includes effectiveness against many bacteria, including in vivo on *Proteus morganii*, and, in addition, against *E. coli*, *P. vulgaris*, *P. mirabilis*, *S. schottmuelleri*, *K. pneumoniae* AD, *K. pneumoniae*, B and *P. arizoniae*.

In addition to the specific end product as defined in structural Formula I, other compounds which are active antibacterials can also be prepared using the process described herein. The compounds which can be prepared have the following structural formula:

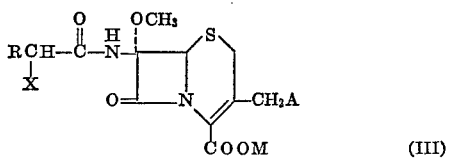

(III)

In addition, the analogous Δ² compounds which can also be prepared using the processes described herein are valuable intermediate compounds because of their greater acid stability, and can be converted to the Δ³ compounds easily. The various substituents have the following meanings:

X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted heterocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl;

A is hydrogen, hydroxy, halo, mercapto, cyano, alkanoyloxy, alkanoylthio, aroyloxy, aroylthio, heteroaryloxy or heteroarylthio, the hetero ring having 5-6 members and having 1-3 hetero atoms, being O, S, or N or combinations thereof, azido, amino, carbamoyloxy, alkoxy, alkylthio, carbamoylthio, thiocarbamoyloxy, benzoyloxy, (p-chlorobenzoyl)oxy, (p-methylbenzoyl)oxy, pivaloyloxy, (1-adamantyl)carboxy, substituted amino such as alkylamino, dialkylamino, alkanoylamino, carbamoylamino, N-(2-chloroethylamino), 5-cyano-triazol-1-yl, 4-methoxy-carbonyl-triazol-1-yl, or quaternary ammonium such as pyridinium, 3-methylpyridinium, 4-methylpyridinium, 3-chloropyridinium, 3-bromopyridinium, 3-iodopyridinium, 4-carbamoylpyridinium, 4-(N-hydroxymethylcarbamoyl) - pyridinium, 4-(N-carbomethoxycarbamoyl)pyridinium, 4-(N - cyanocarbamoyl)pyridinium, 4 - (carboxymethyl)pyridinium, 4-(hydroxymethyl)pyridinium, 4-(trifluoromethyl)pyridinium, quinolinium, picolinium, or lutidinium; N-loweralkylcarbamoyloxy, N,N-diloweralkylthiocarbamoyl, alkanoylcarbamoyloxy, hydroxyphenyl, sulfamoyloxy, alkylsulfonyloxy, or (cis-1,2-epoxypropyl)phosphono; and M is an alkali metal, benzyl, alkanoyloxymethyl, alkylsilyl, phenalkanoyl, benzhydryl, alkoxyalkyl, alkenyl, trichloroethyl, hydrogen, benzoylmethyl, or methoxybenzyl.

Preferably, R is phenyl, or a 5-6 membered heterocyclic ring having 1-2 heteroatoms, the latter being either S, O, or N; X is carboxylamino, or hydrogen;

A is hydrogen, halo, azido, cyano, hydroxy, alkoxy, carbamoyloxy, thiocarbamoyloxy, N - loweralkylcarbamoyl, N,N - diloweralkylcarbamoyloxy, N-loweralkylthiocarbamoyloxy, N,N - diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis-1,2-epoxypropyl)phosphono; and M is alkali metal, benzyl, alkylsilyl, phenalkanoyl, alkoxyalkyl, pivaloyloxymethyl, alkenyl, trichloroethyl, hydrogen, benzoymethyl, or methoxybenzyl.

Even more preferably, X is hydrogen, amino, or carboxyl; R is phenyl or a 5-membered heterocyclic ring having 1-2 hetero atoms, the latter being either S, O or N;

A is hydrogen, loweralkanoyloxy, heteroarylthio, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

Still more preferably, X is hydrogen or carboxyl;

R is phenyl, or a 5-membered heterocyclic ring having one O or one S hetero atom;

A is hydrogen, loweralkanoyloxy, carbamoyloxy, N-loweralkylcarbamoyloxy, N,N-diloweralkylcarbamoyloxy, pyridinium, alkylpyridinium, halopyridinium, or aminopyridinium; and M is sodium, potassium, benzhydryl, methoxymethyl, or hydrogen.

Most preferably, X is hydrogen or carboxyl;

R is phenyl, thienyl, or furyl;

A is hydrogen, loweralkanoyloxy, carbamoyloxy, or pyridinium; and

M is sodium, potassium, benzhydryl, methoxymethyl, or hydrogen.

In addition, compounds of Formula III above wherein the sulfonation is present as the sulfoxide,

can be prepared in this inventive reaction.

It will also be apparent to one skilled in the art that the inventive reaction of this application can be used to prepare analogous compounds in the penicillin series, viz:

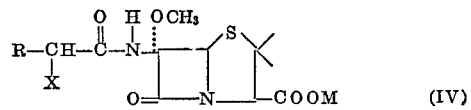

(IV)

wherein R, X, and M are the same as defined in Formula III.

The compounds of Formula III can generally be prepared from 7-ACA or known derivatives thereof using the general process outlined in the preparative examples. Using processes described herein, the 7α-hydroxy-7-iminomethyl ether intermediate is first prepared then the desired 7α-methoxy group substituted pursuant to the inventive processes.

The blocking group on the acid functionality at position-4 of the cephalosporin ring can be removed following any of the reactions of this invention. The removal can be accomplished using methods available to those in the art.

The penicillins of Formula IV can be prepared from 6-APA or known derivatives thereof using procedures analogous to those described for the cephalosporins.

Other starting materials useful in the application of these inventive reactions to prepare the end compounds described herein can be prepared in accordance with known methods, see, e.g., Belgium Pat. 650,444 of U.S. Pat. 3,117,126, or using the following preparations.

The term "loweralkyl" means a carbon chain having 1-6 carbon atoms; when more than one group appears. They can be the same or different. The term "alkyl" means 1-10 carbon atoms; "loweralkanoyl" means 1-6 carbon atoms.

PREPARATION 1

3-hydroxymethyl-7-aminodecephalosporanic acid

The 3-hydroxymethyl-7-aminodecephalosporanic acid is obtained as the lactone by acid hydrolysis of cephalosporin C in accordance with procedures known in this art.

PREPARATION 2

3-pyridiniummethyl-7-aminodecephalosporanic acid

This compound is prepared by treating cephalosporin C with pyridine followed by acid hydrolysis as described in U.S. Pat. 3,117,126.

PREPARATION 3

3-methyl-7-aminodecephalosporanic acid

This compound is prepared from cephalosporin C by catalytic reduction followed by hydrolytic removal of the 5 - aminoadipoyl side chain as described in U.S. Pat. 3,129,224.

PREPARATION 4

3-chloromethyl-7-aminodecephalosporanic acid

This compound is prepared from the 3-methyl compound by reaction with chlorine gas. The bromomethyl or iodomethyl derivatives can be prepared from the 3-hydroxymethyl compound by reaction with phosphorus tribromide or phosphorus triiodide, respectively.

The starting materials used in the preparation of the compounds of Formula I can be prepared as follows:

PREPARATION 5

3-carbamoyloxymethyl-7-aminodecephalosporanic acid 7-aminocephalosporanic acid is treated with 5-butoxycarbonylazide to produce the 7β - (5 - butoxycarbonyl) derivative in accordance with known methods. This derivative is then intimately contacted with citrus acetylesterase in aqueous phosphate buffer at pH 6.5–7 for 15 hours and 3-hydroxymethyl 7β-(5-butoxycarbonyl)-aminodecephalosporanic acid is recovered from the resulting reaction mixture.

To 0.2 g. of 3-hydroxymethyl 7β-(5-butoxycarbonyl) aminodecephalosporanic acid suspended in 5 ml. of acetonitrile, cooled to 0° C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3-carbamoyloxymethyl-7β-(t-butoxycarbonyl) - aminodecephalosporanic acid which is recovered as a yellow solid.

3-carbamoyloxymethyl-7β-(t - butoxycarbonyl)amino-decephalosporanic acid (0.5 g.) in 3.5 ml. of anisole is stirred with 2 ml. of trifluoroacetic acid at 0° C. for 5 minutes. The resulting reaction mixture is evaporated under reduced pressure to afford 3-carbamoyloxymethyl-7-aminodecephalosporanic acid which is purified further by crystallization from ethylacetate.

PREPARATION 6

Trimethylsilyl 3-carbamoyloxymethyl-7-aminodecephalosporanate

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl 3-carbamoyloxymethyl-7-aminodecephalosporanate.

PREPARATION 7

Benzhydryl 7-[1-methoxy-2-(2-thienyl)ethylideneamino] 7-hydroxy-3-carbamoyloxymethyldecephalosporanate (A) 7 - amino-3-carbamoyloxymethyldecephalosporanic acid benzhydryl ester: 272 mg. of 7-amino-3-carbamoyl-oxymethyldecephalosporanic acid is slurried 5 min. at 25° C. in 7 ml. dioxane with 170 mg. p-toluenesulfonic acid $H_2O$. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient $K_2HPO_4$ to bring the pH to 8. The layers are separated and the aqueous portion extracted twice more with $CH_2Cl$. The combined organic layers are dried with sodium sulfate, filtered and evaporated, leaving oily crystals. Washing with ether affords a dry solid which is the product, 7-amino-3-carbamoyloxymethyldecephalosporanic acid benzhydryl ester.

In a like manner, the benzhydryl and other esters of 3-methyl - 7-aminodecephalosporanic acid, 3-chloromethyl-7 - aminodecephalosporanic acid, and 7 - aminocephalosporanic acid can be prepared.

(B) Benzhydryl 3 - carbamoyloxymethyl-7-(2-thienyl-acetamido)decephalosporanate: Benzhydryl 7 - amino-3-carbamoyloxy-methyldecephalosporanate (452 mg.) is reacted with 161 mg. thienylacetyl chloride in 25 ml. methylene chloride containing 0.5 ml. pyridine.

The reaction mixture is held at 0° C. for 15–60 minutes and then raised to room temperature and held an additional 15–60 minutes. The mixture is then washed with water, dilute phosphoric acid (buffered to pH 2), water, and dilute sodium bicarbonate. After drying with $MgSO_4$, the solution is filtered and evaporated. The crude solid is purified by chromatography on silica gel, and eluted using, for instance 4:1 chloroform-ethyl acetate. The product prepared is the benzhydryl 7 - (2 - thienylacetamido)-3-carbamoyloxymethyldecephalosporanate.

(C) Benzhydryl 3-carbamoyloxymethyl-7-[1-methoxy-2 - (2 - thienyl)ethylideneamino]decaphalosporanate: Benzhydryl 7 - (2 - thienylacetamido)-3-carbamoyloxymethyldecephalosporanate (2.5 g.) in 260 ml. of methylene chloride and 10 ml. of pyridine is added over 10 minutes to a clear solution of 6.25 g. of $PCl_5$ in 100 ml. of methylene chloride. The temperature is maintained at −20° C. After 45 minutes, 64 ml. of methanol is added and the temperature allowed to rise to 15° C. The solvents are removed at low temperature in vacuo. The crude material is then purified by chromatography. The eluant is then removed at −20° C. in vacuo. The imino ether intermediate is used directly in the next step. However, IR and NMR spectra indicate that the structure corresponding to the compound benzhydryl 3 - carbamoyloxymethyl-7-[1-methoxy - 2 - (2 - thienyl)ethylideneamino]decephalosporanate is present.

(D) Benzhydryl 3-carbamoyloxymethyl-7-[1-methoxy-2 - (2 - thienyl)ethylideneamino - 7 - hydroxy decaphalosporanate: Benzhydryl 7 - [1-methoxy-2-(2-thienylethylideneamino] - 3 - carbamoyloxymethyldecephalosporanate, 527 mg., is dissolved in 20 ml. dry tetrahydrofuran. At −78° C., under nitrogen, 0.435 ml. of 2.3 M phenyl lithium is added. The reaction mixture is allowed to rise in temperature to −50° C. The intermediate compound, benzhydryl 3 - carbamoyloxymethyl - 7-[1-methoxy-2-(2-thienyl)ethylideneamino] - 7-lithiodecephalosporanate is thereby prepared but is not isolated or further characterized. It is identified by the presence of an intense blue coloration in the reaction mixture.

The reaction mixture is then brought to 0° C. and stirred vigorously with one equivalent of t-butyl-hydroperoxide for ten minutes. 200 ml. of benzene is added, and the solution is washed three times with water, dried with $MgSO_4$, filtered and evaporated, yielding benzhydryl 3 - carbamoyloxymethyl - 7 - [1-methoxy-2-(2-thienyl)-ethylideneamino]-7-hydroxy-decephalosporanate.

This invention is further illustrated by the following examples.

EXAMPLE 1

Benzhydryl 3-carbamoyloxymethyl-7-methoxy-7-(2-thienyl-acetamido)decephalosporanate Benzhydryl 3 - carbamoyloxymethyl - 7-hydroxy-7-[1-methoxy - 2 - (2-thienyl)ethylideneamino]decephalosporanate, 280 mg., is stirred in 10 ml. $CH_2Cl_2$. A catalyst solution, 0.3 ml. (made in this way: to 19 ml. diethyl ether in a 25 ml. volumetric flask is added, at 0° C., 0.133 ml. concentrated fluoroboric acid, followed by methylene chloride to the mark), is added, followed by the slow addition of 3.9 ml. 0.45 M diazomethane in methylene chloride. After one hour's additional stirring, one drop of additional catalyst solution is added. The solution is stirred for one hour at room temperature, diluted with 75 ml. of ethyl acetate containing 0.1 ml. of acetic acid. The mixture is then washed with dilute hydrochloric acid, then dried over $MgSO_4$, filtered and evaporated, affording benzhydryl 3 - carbamoyloxymethyl - 7-methoxy-7-(2-thienylacetamido)-decephalosporanate.

Other catalysts that may be used for this reaction are either boron trifluoride-etherate or aluminum chloride, in place of fluoroboric acid.

EXAMPLE 2

Benzhydryl 3-carbamoyloxymethyl-7-methoxy-7-(2-thienyl-acetamido)decephalosporanate (A) Benzhydryl 3 - carbamoyloxymethyl-7-hydroxy-7-[1 - methoxy - 2 - (2-thienyl)ethylideneamino]decephalosporanate, 543 mg., is stirred in 10 ml. ethylene dichloride at —40° C. under nitrogen, and converted to its lithium salt by the addition of 0.435 ml. 2.3 M t-butyl lithium. To this solution with stirring at 0° C. is slowly added a solution of mesityl dimethoxycarbonium tetrafluoroborate (280 mg.) in 10 ml. ethylene dichloride, all under nitrogen. After another ten minutes of stirring, the solution is diluted with 150 ml. of ethyl acetate acid. The mixture is then washed with dilute hydrocholric acid, dried over $MgSO_4$ filtered and evaporated, affording the crude product admixed with methyl mesitoate. The product, benzhydryl 3 - carbamoyloxymethyl - 7-methoxy-7-(2-thienyl-acetamido)-cephalosporanate, is purified by chromatography.

(B) Benzhydryl 3 - carbamoyloxymethyl-7-hydroxy-7-[1 - methyl-2-(2-thienyl)ethylideneamino]decephalosporanate, 543 mg., is stirred in 10 ml. methylene chloride at —50° C. under nitrogen, and converted to its lithium salt by the addition of 0.435 ml. 2.3 M t-butyl lithium. To this solution at 25° C. with stirring under nitrogen is slowly added a solution of 242 mg. tetramethoxyphosphonium tetrafluoroborate in 10 ml. methylene chloride. The reaction mixture is aged one hour, diluted with ethylacetate/acetic acid, washed with dilute hydrochloric acid, dried over $MgSO_4$, filtered, evaporated and chromatographed to afford pure benzhydryl 3-carbamoyloxymethyl-7-methoxy-7-(2-thienylacetamido)decephalosporanate.

(C) Benzhydryl 3-carbamoyloxymethyl-7-hydroxy - 7-[1-methyl - 2 - (2 - thienyl)ethylideneamino]decephalosporanate, 543 mg. is stirred in 10 ml. methylene chloride at —50° C. under nitrogen, and converted to its lithium salt by the addition of 0.435 ml. 2.3 M t-butyl lithium. The solution is then cooled to —78° C. and, still under nitrogen, 393 mg. dimethyliodonium hexafluoroantimonate is added, in portions. The reaction temperature is slowly brought up to —20° C., and the mixture is then pumped at 0.1 mm. to remove methyl iodide. The residue is diluted with ethylacetate/acetic acid, washed with dilute hydrochloric acid, dried over $MgSO_4$, filtered and evaporated to afford the product, benzhydryl 3-carbamoyloxymethyl-7-methoxy-7 - (2 - thienylacetamidodecephalosporanate, which can be purified by chromatography.

The corresponding dimethyl chloronium and dimethylbromonium salts can be substituted for the dimethyliodonium salt in this procedure, to yield the same product.

EXAMPLE 3

Benzhydryl 3-carbamoyloxymethyl-7-methoxy-7-(2-thienylacetamido)decephalosporanate Benzhydryl 3-carbamoyloxymethyl-7-hydroxy - 7 - [1-methoxy - 2 - (2 - thienyl)ethylideneamino]decephalosporanate, 543 mg., is stirred in 15 ml. dry DMSO. Sodium hydride, 25 mg. (48 mg. of a 50% suspension of NaH in mineral oil, which has been washed with hexane to remove the oil), is added. When hydrogen evolution has ceased, 126 mg. dimethyl sulfate is added. The solution is stirred for one hour at room temperature, diluted with 150 ml. ethylacetate containing 0.1 ml. acetic acid and washed with dilute hydrochloric acid, then water. The solution is dried over $MgSO_4$, filtered and evaporated, leaving benzhydryl 3-carbamoyloxymethyl-7-(2 - thienylacetamido)-7-methoxydecephalosporanate, which may be purified if desired by chromatography on silica gel, eluting with 25:1 chloroform-ethyl acetate.

Other methylating agents may be used in place of methyl sulfate, e.g., an equimolar amount of methyl iodide, bromide or chloride, using the same conditions; or methyl trifluoromethylsulfonate or trimethyloxonium trinitrobenzenesulfonate. The solvent in the latter two reagents is dimethyl ether-HMPA 1:1, using a reaction temperature of —20° C. warming later to 25° C. In each instance, the benzhydryl 3-carbamoyloxymethyl - 7 - (2-thienylacetamido)-7-methoxy - decephalosporanate is obtained after hydrolysis.

EXAMPLE 4

3-carbamoyloxymethyl-7-methoxy-7-(2-thienylacetamido)-decephalosporanic acid

Benzhydryl 3-carbamoyloxymethyl - 7 - (2 - thienylacetamido)decephalosporanate (300 mg.) in 0.5 ml. in anisole and 2.5 ml. of trifluoroacetic acid is reacted for 15 minutes at 10° C. The resulting mixture is evaporated at reduced pressure and flushed twice with anisole. The residue is dissolved in methylene chloride and extracted with 5% sodium bicarbonate solution. The aqueous solution is adjusted to pH 1.8 with 5% phosphoric acid and extracted with ethyl acetate. The organic solution is dried and evaporated to yield the pure 3-carbamoyloxymethyl-7-methoxy-7 - (2 - thienylacetamido) - decephalosporanic acid, M.P. 165–167° C. UV and NMR analysis provide data consistent with the assigned structure.

EXAMPLE 5

Sodium 3-carbamoyloxymethyl-7-methoxy-7-(2-thienylacetamido)-decephalosporanate

The procedure as in Example 4 is followed, except that the pH is adjusuted to 8.0 with dilute sodium hydroxide and concentrated under vacuum to remove the solvents. The mono sodium salt of 3-carbamoyloxymethyl-7-methoxy-7-(2 - thienylacetamido)decephalosporanic acid is recovered.

What is claimed is:

1. The process of preparing the compound having the formula:

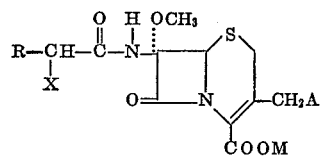

wherein X is hydrogen, amino, or carboxyl; R is phenyl, thienyl or furyl; A is hydrogen, loweralkanoyloxy, carbamoyloxy, thiocarbamoyloxy, N-loweralkylcarbamoyloxy, N-loweralkylthio, carbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzhydryl, trimethylsilyl, trichloroethyl, methoxymethyl, hydrogen, benzoylmethyl, or methoxybenzyl, which comprises reacting a compound of the formula:

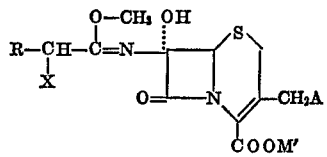

wherein R, X, and A are the same as above, and M' is benzhydryl, trimethylsilyl, trichloroethyl, methoxymethyl, benzoylmethyl or methoxybenzyl, with
  (a) approximately equivalent amounts each of diazomethane and a Lewis acid catalyst at a temperature between about −20° C. and ambient, or
  (b) with about an equivalent amount of a strong inorganic base followed by addition of about an equivalent amount of a methylating agent, at a temperature between about −80° C. to 10° C.;
then acidifying the resultant reaction mixture;
and then deblocking when M is hydrogen optionally followed by addition of sodium or potassium hydroxide when M is sodium or potassium.

2. The process of claim 1 in which the Lewis acid catalyst is fluoroboric acid, boron trifluoride etherate, or aluminum chloride.

3. The process of claim 1 in which the strong inorganic base is phenyl lithium, t-butyl lithium, or sodium hydride.

4. The process of claim 1 in which the methylating agent is methylsulfate, dimethyliodonium hexafluoroantimonate, methyl mestyl dmethoxycarbonum tetraauz fluoroborate, or tetramethoxyphosphonium tetrafluoroborate.

5. The process of claim 1 in which R is phenyl or thienyl, X is carboxyl or hydrogen, and A is carbamoyloxy, loweralkanoyloxy, or pyridinium.

6. The process of claim 5 in which R is thienyl, X is hydrogen, and A is carbamoyloxy.

7. The process of claim 5 in which R is thienyl, X is carboxyl, and A is carbamoyloxy.

8. The process of claim 5 in which R is phenyl, X is carboxyl and A is acetoxy.

References Cited

Nagarajan et al., Jacs 93:9 May 1971, pp. 2308–2312.

NICHOLAS S. RIZZO, Primary Examiner

U.S. Cl. X.R.

260—239.1; 424—246, 271

UNITED STATES PATENT OFFICE
CERTIFICATE OF CORRECTION

Patent No. 3,780,037     Dated December 18, 1973

Inventor(s) GEORGE G. HAZEN

It is certified that error appears in the above-identified patent and that said Letters Patent are hereby corrected as shown below:

In column 10, Claim 4, lines 3, 4 and 5 should read:

antimonate, methyl mesityl dimethoxycarbonium tetrafluoroborate, or tetramethoxyphosphonium tetrafluoroborate.

Signed and sealed this 9th day of April 1974.

(SEAL)
Attest:

EDWARD M.FLETCHER,JR.
Attesting Officer

C. MARSHALL DANN
Commissioner of Patents